United States Patent [19]

Snyder et al.

[11] 3,918,049

[45] Nov. 4, 1975

[54] THRESHOLDER FOR ANALOG SIGNALS

[75] Inventors: Gary Francis Snyder; David Alan Styczinski, both of Rochester, Minn.

[73] Assignee: International Business Machines Corporation, Armonk, N.Y.

[22] Filed: Aug. 5, 1974

[21] Appl. No.: 494,941

Related U.S. Application Data

[63] Continuation of Ser. No. 317,964, Dec. 26, 1972, abandoned.

[52] U.S. Cl. .................................... 340/146.3 AG

[51] Int. Cl.$^2$ .................................... G06K 9/00

[58] Field of Search ............340/347 AD, 146.3 AG, 340/146.3 Y; 178/DIG. 29, DIG. 26

[56] References Cited

UNITED STATES PATENTS

| | | | |
|---|---|---|---|
| 3,104,372 | 9/1963 | Rabinow et al. | 250/219 CR X |
| 3,166,743 | 1/1965 | Greenwald | 340/347 AD |
| 3,466,603 | 9/1969 | Shelton | 178/7.2 X |
| 3,479,642 | 11/1969 | Bartz | 340/146.3 AG |
| 3,505,637 | 4/1970 | Abruzzo | 343/17.1 R X |
| 3,534,334 | 10/1970 | Bartz et al. | 340/146.3 AG |
| 3,582,887 | 6/1971 | Guthrie | 340/146.3 AG |
| 3,588,821 | 6/1971 | La Salle et al. | 340/146.3 AG |
| 3,662,341 | 5/1972 | Baumgartner et al. | 340/146.3 AG |
| 3,665,326 | 5/1972 | Sullivan | 340/146.3 AG |
| 3,668,637 | 6/1972 | Sakai et al. | 340/146.3 AG |
| 3,715,724 | 2/1973 | Demonte et al. | 340/146.3 AG |

OTHER PUBLICATIONS

Dorr et al., "Thresholding Method – – –," IBM Technical Disclosure Bulletin, Vol. 15, No. 8, 1/1973, pp. 2595, 2596.

*Primary Examiner*—Thomas J. Sloyan
*Attorney, Agent, or Firm*—J. Michael Anglin

[57] ABSTRACT

Analog input samples are converted to logarithmic digital levels. One of the levels is selected as a threshold from the past history of various sets of the levels in plural reversible saturable counters. The particular sets recorded by each counter are modified for different contents of the counters.

9 Claims, 1 Drawing Figure

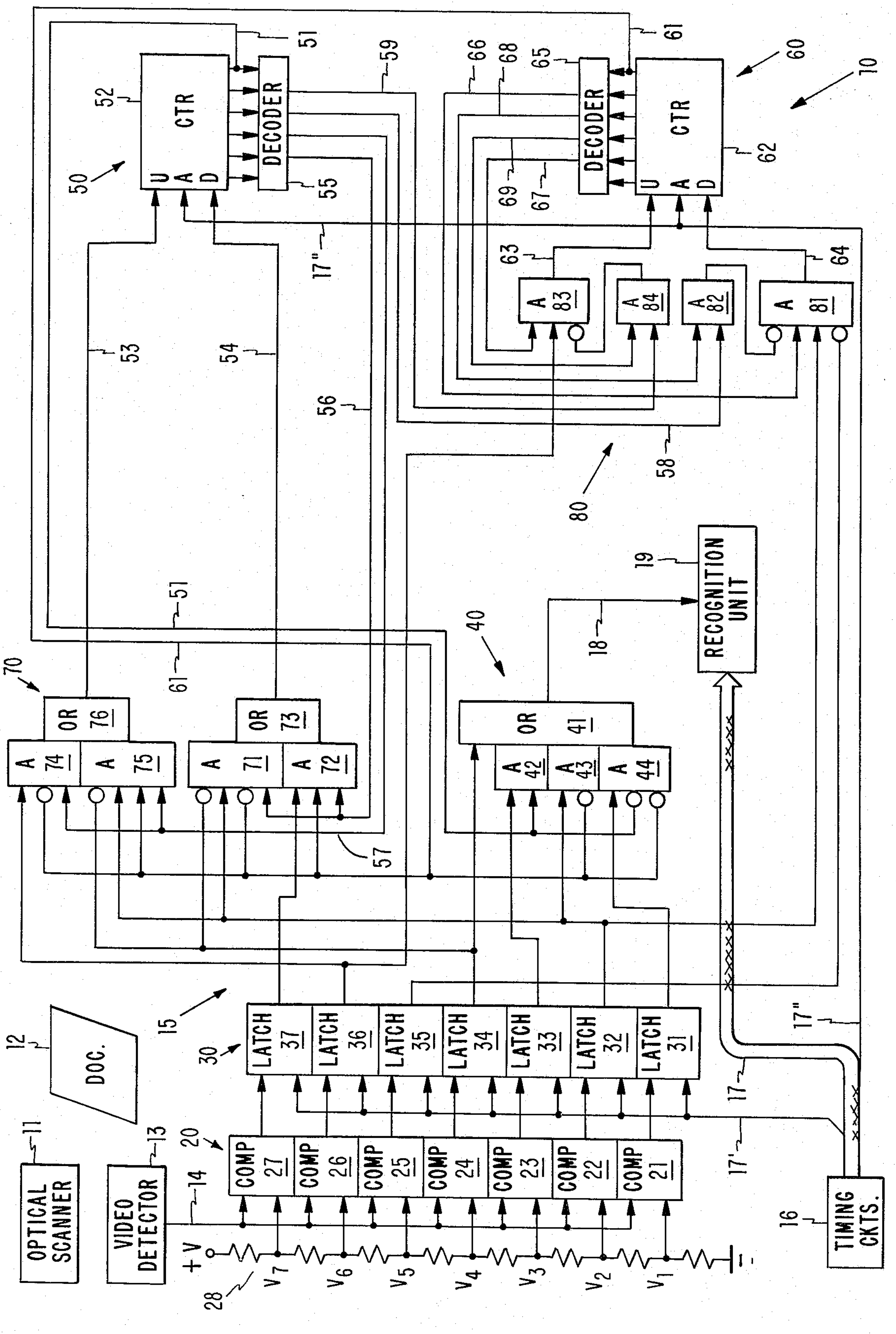
OPTICAL SCANNER
VIDEO DETECTOR
DOC.
COMP
LATCH
TIMING CKTS.
RECOGNITION UNIT
OR
A
CTR
DECODER
U A D

THRESHOLDER FOR ANALOG SIGNALS

This is a continuation, of application Ser. No. 317,964, filed Dec. 26, 1972, now abandoned.

BACKGROUND OF THE INVENTION

The present invention relates to electrical communications, and more particularly concerns the analog-to-digital conversion of video signals for pattern recognition, transmission, or the like.

In many fields of endeavor, it is required to digitize or quantize an analog input signal into a high-contrast digital signal having only a small number of possible values. This requirement is carried to an extreme in many systems for image transmission and analysis. Such systems are designed to operate from a binary-valued signal which only indicates whether a given area being scanned is a part of a pattern or of the background of the pattern. The pattern signals are usually called "black" or "one", and the background "white" or "zero", regardless of the actual colors or other conditions which give rise to them.

Both short-term and long-term variations in the signal amplitudes for both the pattern and the background arise from many different sources, so that the use of a fixed threshold is usually inadequate. Rather, the digitizer must itself function as a recognition system to determine an optimum threshold for each analog sample. This result may be accomplished by considering a history of the amplitudes of other analog input samples, and adjusting the threshold in accordance with a function of these other samples.

There are conventional digitizers which provide accurate and sophisticated thresholding under the above circumstances. Such digitizers, however, have various disadvantages in that they are complex and expensive, they require frequent and painstaking adjustments for proper operation, and the diagnosis of malfunctions is difficult, often requiring specialized test equipment. The result of these disadvantages is that the availability of accurate thresholding has heretofore been limited to relatively small numbers of expensive systems.

SUMMARY OF THE INVENTION

The present invention advances the arts of digitizing analog signals by providing an apparatus and method which provides accurate thresholding at a greatly reduced cost and complexity. Moreover, the invention eliminates the need for adjustments under all normal operating conditions. It also is much more easily serviceable, in addition to being more reliable.

The invention minimizes the amount of analog circuitry required by immediately converting the input signal to digital level signals indicative of different amplitudes of the input signal. These amplitudes preferably have a nonlinear, e.g., logarithmic, relationship. Plural control means then produce direction-control signals in response to certain sets of the levels. Each control means receives a pair of sets to produce an "up" control signal for one set of the pair and a "down" signal for the other set. The control signals are coupled to plural reversible counting means, which then produce state signals indicative of their contents. A threshold is chosen in accordance with the state signals, so that an output signal may be generated for any input signal which exceeds the threshold. The state signals may also be transmitted to the control means for modifying the sets which produce the various control signals. Certain sets may be completely inhibited, for instance, to cause a counting means to saturate; or the state signal from one counting means may cause another counting means to stop at particular points, or to count on a different pair of sets of levels.

Other objects, advantages and features of the invention, as well as modifications within the spirit and scope thereof, will become apparent to those skilled in the applicable arts from the following detailed description of a preferred embodiment, taken in conjunction with the accompanying drawing.

DRAWING

The single FIGURE of the drawing is a block diagram of a pattern-recognition system incorporating the invention, and showing in greater detail a digitizer according to the invention.

DESCRIPTION OF PREFERRED EMBODIMENT

Reference numeral 10 in the drawing denotes generally a representative pattern-recognition system incorporating the present invention. Optical scanner 11 provides illumination of a document 12 or other information-bearing medium. Video detector 13 receives light reflected from document 12 and converts it to a time-varying analog electrical signal on digitizer input line 14. Detector 13 may include conventional compensation circuits for establishing absolute white and absolute black signal levels, in spite of variations in the characteristics of the optical and electrical components of scanner 11 and detector 12. The video signal on line 14 may be considered to represent a contrast function varying between 0% (absolute white) and 100% (absolute black).

The purpose of digitizer 15 is to convert the analog signal on line 14 to a sequence of binary digits which specify whether the corresponding areas of document 12 should be classified as white (background) or black (pattern). The extent of the area represented by each digit is determined by conventional timing circuits 16 which emit spaced pulses on output lines 17. Successive binary digits on digitizer output line 18 form a bit stream which is transmitted to recognition unit 19. Unit 19 may be of any conventional type, and may include such functions as image storage and consolidation, normalization, feature extraction, and so forth.

Although recognition system 10 shows a particular form in which the invention finds utility, it may also be incorporated into other systems having differing requirements and component units.

Within digitizer 15, the analog signal on line 14 is immediately converted to a set of digital levels by analog-to-digital converter 20. Converter 20 comprises a series of comparators 21–27, each of which produces an output signal whenever the voltage on line 14 exceeds a predetermined reference voltage. These reference voltages are obtained from taps on a voltage divider 28 which receives a constant voltage +V related to the 100% contrast amplitude. Although the taps on divider 28 are shown in fixed positions, the reference voltages applied to each comparator may be adjustable or may be programmable by an external means (not shown).

The reference voltages may be set at any desired levels. It has been found, however, that a substantially logarithmic sequence produces optimum results. Denoting the level voltages by $V_i$, this relationship is satisfied if $V_i' \approx KV_{i-1}$, where K is an arbitrary constant. Taking a 100% level as absolute black, the following percentages may be used for each reference voltage:

$$V_1\ V_2\ V_3\ V_4\ V_5\ V_6\ V_7$$

Reference
Voltage: 10.0% 13.4% 18.1% 24.3% 32.6% 43.7% 58.6%

Thus, comparator 21 produces a binary one whenever the analog video on line 14 is greater than 10% of +V, comparator 22 produces a one whenever the video signal exceeds 13.4% of absolute black, and so forth. More or fewer than seven levels may of course be chosen.

Storage 30 quantizes in time the level signals produced by converter 20. The output of each comparator 21–27 is connected to the data input of a corresponding latch 31–37. The data are entered into the latches upon the appearance of a recurring clock pulse on line 17' from timing circuits 16. The outputs of latches 31–37 are therefore allowed to change only at discrete intervals determined by the clock-pulse period. For brevity, "one" output signals from latches 31–37 will hereinafter be referred to as level No. 1-level 7 signals respectively.

Output gating means 40 transmits one of the level signals No. 1–No. 4 to line 18 as digitized output bits. Since latch 34 is directly connected to OR gate 41, an output bit is always produced when the current video sample exceeds voltage $V_4$. Latch 33 transmits level No. 3 to AND gate 42, so that a video sample which exceeds $V_3$ does not produce an output bit unless this gate is enabled (unless, of course, the sample also exceeds $V_4$). A level No. 2 signal produces an output bit only when AND 43 is enabled. A circle at the input of a logic block in the drawing signifies that the signal on the corresponding line is inverted before being applied to that block. Similarly, a level No. 1 signal energizes line 18 only when AND 44 is enabled. In this manner output means 40 selects one of the voltages $V_1$–$V_4$ as a threshold level and transmits a bit from converter 20, which has been time-quantized by storage 30, whenever the current video input signal exceeds this voltage.

Counting means 50, 60 record the past history of various ones of the level signals, and produce state signals on lines 51 and 61 indicative of the relative numbers of the various levels which have been encountered among the recent video samples from line 14. Combinations of these state signals define states of the counting means 50, 60 for the selection of a threshold by output means 40. In state 00, for instance, neither of the lines 51, 61 is energized; therefore, AND 44 is enabled through its inverting inputs to pass level No. 1 signals through OR 41. That is, any current video sample which exceeds $V_1$ is passed as a black bit to line 18 for state 00 of counting means 50, 60. State 10 of the counting means enables AND 43, through an inverting input coupled to line 61, thereby selecting level No. 2 as the threshold. AND 43 is also enabled in state 00, but AND 44 already passes any level equal to or exceeding level No. 1 in the latter state. Line 51 enables AND 42 in counting-means state 11 to select level No. 3 as the threshold. Although AND 42 is also enabled in state 10, its function is pre-empted in this state because of the selection of a lower threshold, level No. 2, by AND 43. Level No. 4 becomes the threshold in state 01 by default, since none of the AND's 42–44 is enabled in this state.

Counting means 50 contains a six-stage reversible binary counter 52 which is advanced by pulses on line 17''. Timing circuits 16 supply a pulse on this line for every pulse on line 17', but delayed therefrom by a short time. Each pulse on line 17'' increments counter 52 if its "up" input is enabled by a control signal on line 53, and decrements the counter if its "down" input is enabled by line 54. If neither input is enabled, pulses on line 17'' do not change the counter's contents. Line 51 is connected to the high-order state of counter 52, so that it is energized whenever counter 52 is in the upper half of its range; i.e., when it contains a count of 32 through 63. In addition, conventional decoder 55 produces auxiliary state signals 56–59 for other control purposes. Counting means 60 also contains a six-stage counter 62 advanced by line 17''. The direction of counting is determined by control signals on lines 63 and 64. Line 61 is connected to the high-order stage of counter 62, and decoder 65 produces auxiliary state signals 66–69 which depend upon the contents of counter 62.

Control means 70, 80 determine the conditions under which the contents of counters 52, 62 are changed by pulses on line 17'', and the direction of the change. Control means 70, 80 respond to predetermined sets of the level signals from storage 30, and to the state signals from counting means 50, 60.

One function of control means 70 is to prevent its associated counter 52 from overflowing or underflowing. To this end, decoder 55 produces a signal on line 56 whenever counter 52 is not in an empty state. When the counter contains all zeros, however, the absence of a signal on line 56 disables AND's, 71 and 72, thereby preventing a control signal from passing through OR 73 to line 54 as long as counter 52 remains in this state. Similarly, decoder 55 produces a "not full" signal on line 57 whenever counter 52 does not contain all ones. The absence of the "not full" signal disables AND's 74 and 75, so that OR 76 cannot allow counter 52 to wrap around to an all-zero state. Counter 52 is thus saturable in either a full or an empty state; that is, it is allowed to count only a predetermined amount in either direction. This feature has two advantages. First, it prevents false signals on line 51 while limiting the length of counter 52 to a reasonable size. Second, it limits the number of level signals which can effect a threshold change in either direction, analogous to the time constant of an analog circuit.

Control means 70 also determines which level signals may cause counter 52 to advance in a particular direction, in response to the state of the other counting means 60. When the high-order bit of counter 62 is zero, the absence of a signal on line 61 enables AND 74 to pass a control signal from latch 36 to UP line 53, and also enables AND 71 to energize DOWN line 54 from latch 32 unless latch 34 is also energized. For the zero state of counting means 60, then, counter 52 increments on the set of levels No. 6 and No. 7, and decrements on the set of levels No. 2 and No. 3, until it saturates in a full or empty condition. But, when line 61 is energized, AND 75 is enabled by latch 32 and disabled by latch 34, while AND 72 is enabled by latch 37, so that counter 52 is incremented on levels No. 2 and No. 3, and decremented on a set containing level No. 7 alone. The significance of this level-set modification will be explained hereinafter.

Control means 80 also has a saturation function for its associated counting means 60. The absence of a "not empty" signal from decoder 65 causes line 66 to disable AND 81, thereby preventing line 64 from allowing any further decrement in counter 62 when it contains all zeros. The absence of a "not full" signal on line 67 similarly disables AND 83 when counter 62 contains all ones.

Although control means 80 is not directly dependent upon the state signals on lines 51 and 61, it is responsive to auxiliary state signals from decoders 55 and 65. More specifically, line 58 is energized when the contents of counter 52 is less than three-fourth of its full capacity, i.e., less than 48. Line 68 carries a signal when counter 62 exactly equals 32. AND 82 disables AND 81 when both of these conditions are fulfilled. Otherwise, the outputs of latches 32 and 35 cause counter 62 to decrement on levels No. 2, No. 3 and No. 4. The ultimate effect of AND 82 is thus to prohibit line 61 from being de-energized until counter 52 has reached the upper one-fourth of its range. AND 84 performs an opposite function, with a different cut-off point. The coexistence of signals on lines 59 and 69, from decoders 55 and 65, prevent counter 62 from incrementing upward when counter 52 contains less than 32 and when counter 62 contains exactly 31. This prevents line 61 from being energized until counter 52 has reached the lower one-half of its range. When AND 84 is disabled, the output of latch 36 causes counter 62 to increment on levels No. 6 and No. 7. Counter 62 therefore saturates at each end of its range of contents, and may also be held at its midpoint in response to the contents of counter 52. Moreover, the midpoint saturation conditions for counter 62 differ depending upon the direction from which this point is approached. The specific pair of level sets which respectively cause counter 62 to count up and down are not modified by control 80 in the same manner as they are for counter 52 by control 70. Rather, they are merely inhibited under certain conditions, i.e., they are modified to null sets containing no levels.

The above-described interrelationship of counting means 50, 60 and control means 70, 80 analyzes the number of occurrences of recent past level signals so as to produce state signals on lines 51, 61 which select one of the levels from latches 31–37 as a threshold. The counting operation allows the level statistics to change to some degree before a threshold change is ordered. On the other hand, the saturability of the counters at various points restricts the degree to which levels in the farther past can cause a movement away from a threshold-transition point. Saturability also prevents undesired state transitions which might otherwise cause the threshold to change by more than one level during a single video sample. The number of counters, levels, states and thresholds, however, may be modified for different applications. The storage, control, counting and output gating functions may also, of course, be implemented in many different ways, such as by different logic configurations or even by programming in a data processor, where sufficiently low data rates may permit such an implementation.

OPERATION OF THE PREFERRED EMBODIMENT

Digitizer 15 first performs an immediate conversion of the analog signal on line 14 to a number of logarithmically related digital levels in converter 20, and then quantizes these levels in time by means of storage unit 30. Counting means 50, 60 record the numbers of certain sets of the levels which have occurred in the more recent past. The particular conditions under which various sets of levels are to be recorded, are specified by control means 70, 80. One of the digital levels is selected as a threshold in response to state signals produced by counting means 50, 60, and output means 40 produces a "black" bit if the current video sample on line 14 equals or exceeds the selected threshold.

As has been explained, each state signal 51, 61 divides its associated counter 52, 62 into two states or counting ranges, 0–31 and 32–63. It is not necessary however that these ranges have the same length or boundary for both counters, nor that the ranges divide the counter capacity exactly in half. For two binary-valued state signals 51, 61, four different thresholds may be selected. The counter states may be defined as follows.

TABLE I

| State Signal | Contents of Counter 52 | Contents of Counter 62 | (Threshold Level) |
|---|---|---|---|
| 00 | 0–31 | 0–31 | No. 1 |
| 10 | 32–63 | 0–31 | No. 2 |
| 11 | 32–63 | 32–63 | No. 3 |
| 01 | 0–31 | 32–63 | No. 4 |

The threshold level selected by each state is included to show that the states may be arranged in a Gray-code sequence, in which only a single bit changes in a transition from any threshold to the next higher or next lower threshold. Threshold level No. 1 represents very light printing on document 12, so that any video signal greater than 10% of absolute black transmits a black bit to recognition unit 19. Threshold level No. 4, on the other hand, signifies the high-contrast or dark printing; when this level is selected, any video signal less than 24.3% of absolute black is considered to be a white output bit.

To achieve the above effect, state signal 61 basically represents the ratio of recently encountered high contrast levels (No. 6, No. 7) to lower contrast levels (No. 2, No. 3, No. 4). State signal 61 is a zero when this ratio is less than unity, and is a one when the ratio is greater than unity. State signal 51 divides each of the above states into two parts. When signal 61 is zero, signal 51 indicates the ratio of high contrast levels (No. 6, No. 7) to low levels (No. 2, No. 3). But, when signal 61 is a one, signal 51 measures the ratio of low levels (No. 2, 3) to a high level (No. 7). The previously explained saturability of the counters prevents any of the ratios from assuming extreme values in long sequences of either high or low levels. It should be noted that the sets of levels which increment counter 52 may differ from the set which increments counter 62, and that the set which decrements counter 52 differs from that which decrements counter 62. Moreover, the state signal 61 modifies the sets of levels which are permitted both to increment and to decrement counter 52. These sets are not merely interchanged, but are also truncated: a zero on line 61 allows incrementing on the set of levels No. 6, No. 7 and decrementing on No. 2, No. 3, while a one on line 61 allows decrementing only on level No. 7 and incrementing on No. 2, No. 3. Thus, it is possible for the ratio measured by counter 52 to approach unity faster from high-contrast conditions than from low-contrast conditions.

The auxiliary state signals on lines 56–59 and 66–69 operate primarily to modify the level sets for preventing undesired changes in the selected threshold.

The "not full" and "not empty" signals on lines 56, 57, 66 and 67 prohibit the gross errors which would otherwise be caused by wrap-around of the counters 52 and 62. If counter 52 did not saturate at a count of 63, for instance, the next No. 6 or No. 7 level would recycle the counter to zero, and thus change the threshold from level No. 2 (state 10) to level No. 1 (state 00), or from level No. 3 (state 11) to No. 4 (state 01), depending upon the contents of counter 62.

The auxiliary state signals on lines 58, 59, 68 and 68 prevent changes to nonadjacent threshold levels for any single video sample. A direct transition from level No. 1 (state 00) to level No. 4 (state 01) is made impossible by the simultaneous occurrence of signals indicating a count less than 32 (line 59) in counter 52 and a border-line count equal to 31 (line 69) in counter 62. Counter 62 may increment up to 31, but cannot cross this boundary until the contents of counter 52 exceeds 31. The reverse transition, from level No. 4 to level No. 1, is blocked by the simultaneous occurrence of a count less than 48 (line 58) in counter 52 and a border-line count equal to 32 (line 68) in counter 62. Threshold level No. 4 cannot be accessed directly from level No. 2, i.e., a transition from state 10 to state 01, since both of the counters increment on the same levels, No. 6 and No. 7, when counter 62 contains 31 and counter 52 is in the range 32–47. Furthermore, counter 62 cannot decrement at all when it contains a 32 and counter 52 is simultaneously in the range 0–31, so that threshold level No. 2 (state 10) cannot immediately follow threshold level No. 4 (state 01). Similar conditions imposed by control means 70, 80 prevent direct transitions between threshold levels No. 1 (state 00) and No. 3 (state 11).

The counting rules imposed by control means 70, 80 may be summarized as follows. If it is not already full or empty, counter 52 increments on levels No. 6, No. 7 and decrements on levels No. 2, No. 3 when counter 62 is in the lower half of its range; when counter 62 is in the upper half of its range, counter 52 increments on levels No. 2, No. 3 and decrements on No. 7. If not already full or empty, counter 62 increments on levels No. 6, No. 7 unless it contains a 31 and counter 52 simultaneously is in the lower half of its range; counter 62 decrements on levels No. 2, No. 3, No. 4 unless it contains a 32 and counter 52 simultaneously is in the lower three-fourth of its range. Other rules may also be devised by those skilled in the art, and a different number of counters and controls may be used in order to change the number of thresholds which may be selected, or to impose different conditions upon the selection of any threshold level.

Having described a preferred embodiment thereof, we claim as our invention:

1. A thresholder for an analog input signal, comprising:

timing means for producing spaced pulses for defining samples of said analog input signal;

converting means for comparing said analog input signal with a plurality of thresholds so as to produce for each of said samples a plurality of binary level signals each indicating whether said input signal exceeds a different one of said thresholds;

control means for combining said binary level signals so as to produce a plurality of direction-control signals indicative of different combinations of said level signals;

counting means for producing state signals indicative of a plurality of said samples, said counting means including a plurality of reversible counters advanceable by said spaced pulses in directions determined by respective ones of said direction-control signals, a plurality of decoders coupled to said reversible counters for producing said state signals in accordance with the contents of said counters, and means coupled to at least one of said decoders for modifying at least one of said different combinations of level signals; and output gating means for transmitting one of said level signals to a recognition unit, said one level signal being selected in response to said state signals, thereby selecting an optimum one of said thresholds.

2. The thresholder of claim 1, wherein said reference signals bear a substantially logarithmic relationship to each other.

3. The thresholder of claim 1, wherein said control means includes means responsive to one of said state signals to inhibit one of said direction-control signals when one of said reversible counters attains a predetermined contents.

4. The thresholder of claim 1, wherein said converting means produces each of said binary level signals on a separate line, such that each said line carries a two-valued signal indicating whether said input signal exceeds a different one of said reference signals.

5. The thresholder of claim 4, wherein said output gating means is coupled directly to said converting means for gating one of said lines to an output line in response to said state signals.

6. Apparatus for thresholding successive samples of an analog input signal into successive two-valued output signals corresponding to respective ones of said samples, said apparatus comprising:

means for producing a plurality of digital levels for each of said successive samples, each of said levels indicating the relation between said each sample and one of a plurality of thresholds;

means for combining said digital levels into a plurality of different sets of said levels;

means counting first and second relative occurrences of a first and second pair of said sets for a plurality of said samples;

means for dividing different ranges of said relative occurrences into a plurality of states;

means for modifying at least one of said sets of said levels in response to said states; and means for transmitting to a recognition unit one of said digital levels for said each sample in response to said states, thereby selecting an optimum one of said thresholds for said each sample.

7. The apparatus of claim 6, wherein said thresholds are substantially nonlinearly related to each other.

8. The apparatus of claim 6, wherein said means for counting is adapted to saturate, when one of said relative occurrences attains a predetermined value.

9. The apparatus of claim 8, wherein said means for counting is further adapted to count third relative occurrences of a third pair of said sets, when said predetermined value is attained.

* * * * *